[12] United States Patent
Eichner et al.

(10) Patent No.: US 10,167,140 B2
(45) Date of Patent: Jan. 1, 2019

(54) DEVICE AND METHOD FOR TRANSPORTING ELONGATED METAL MATERIAL

(71) Applicant: Muhr und Bender KG, Attendorn (DE)

(72) Inventors: Harald Eichner, Hennef (DE); Christoph Schneider, Lennestadt-Elspe (DE); Stephan Pritz, Schwerte (DE)

(73) Assignee: Muhr und Bender KG, Attendorn (DE)

( * ) Notice: Subject to any disclaimer, the term of this patent is extended or adjusted under 35 U.S.C. 154(b) by 0 days.

(21) Appl. No.: 15/450,058

(22) Filed: Mar. 6, 2017

(65) Prior Publication Data
US 2017/0260005 A1    Sep. 14, 2017

(30) Foreign Application Priority Data
Mar. 8, 2016  (DE) .................. 10 2016 104 182

(51) Int. Cl.
| B65G 15/14 | (2006.01) |
| B65G 21/20 | (2006.01) |
| B65G 21/12 | (2006.01) |
| B21D 43/00 | (2006.01) |
| B21D 43/12 | (2006.01) |
| B21C 1/30 | (2006.01) |
| B65H 51/14 | (2006.01) |
| B21C 47/34 | (2006.01) |

(52) U.S. Cl.
CPC .............. B65G 21/209 (2013.01); B21C 1/30 (2013.01); B21C 47/3458 (2013.01); B21D 43/006 (2013.01); B21D 43/12 (2013.01); B65G 15/14 (2013.01); B65G 21/12 (2013.01); B65H 51/14 (2013.01); *B65G 2201/0217* (2013.01); *B65H 2701/36* (2013.01)

(58) Field of Classification Search
CPC ..... B65G 21/206; B65G 15/14; B65G 21/209
USPC ......... 100/152, 327; 198/626.1, 626.5, 626.6
See application file for complete search history.

(56) References Cited

U.S. PATENT DOCUMENTS 9,156,073 B2 * 10/2015 Wang ...................... B21C 37/08

FOREIGN PATENT DOCUMENTS

| DE | 32 08 158 A1 | 9/1983 | |
| DE | 40 09 862 A1 | 10/1991 | |
| DE | 4009862 A1 * | 10/1991 | ............... B21C 1/30 |
| DE | 299 09 850 U1 | 9/1999 | |
| DE | 10 2004 047 048 A1 | 4/2006 | |

(Continued)

*Primary Examiner* — Gene O Crawford
*Assistant Examiner* — Lester Ill Rushin
(74) *Attorney, Agent, or Firm* — Bejin Bieneman PLC

(57) ABSTRACT

A device for transporting elongated metal material comprises two chain drive units with a continuous chain, which are arranged such that the elongated material is passed through between the chains with frictional contact so that the elongated material is moved; two controllable pressure units configured to apply pressure forces to the chains towards each other; at least one controllable adjusting unit which is mechanically connected to at least one of the chain drive units and which is configured to move same in a longitudinal direction of the elongated material during operation. A plant can have such a device, and a process is used for controlling such a device.

17 Claims, 1 Drawing Sheet

(56) References Cited

FOREIGN PATENT DOCUMENTS

Figure 1:
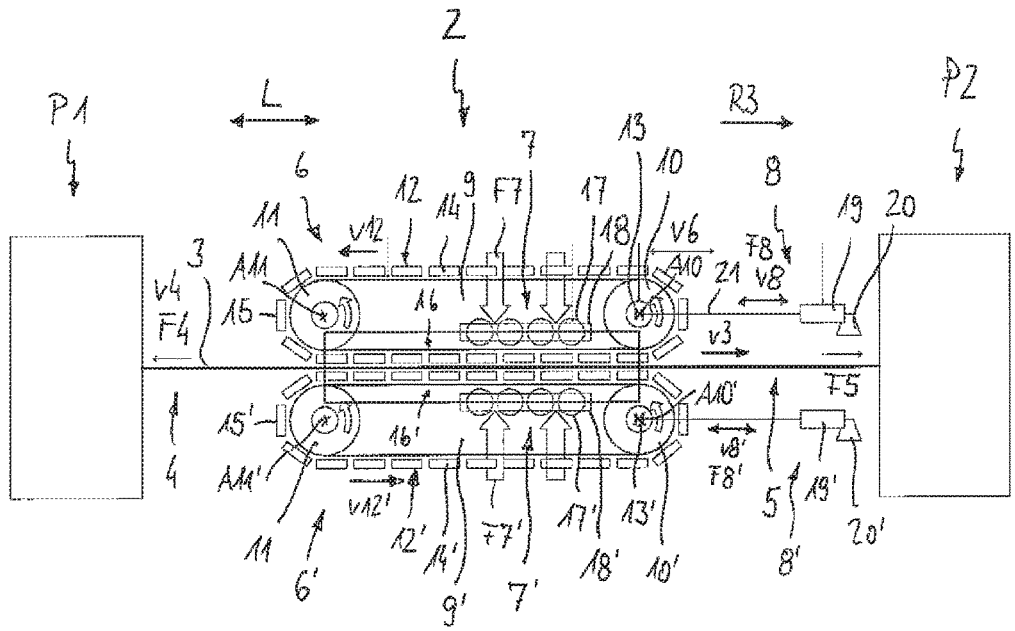

| JP | H07275923 A | 10/1995 |
|---|---|---|
| WO | 2010067576 A1 | 6/2010 |

\* cited by examiner

DEVICE AND METHOD FOR TRANSPORTING ELONGATED METAL MATERIAL

CROSS-REFERENCE TO RELATED APPLICATIONS

This application claims priority to German Application No. DE 10 2016 104 182.3 filed on Mar. 8, 2016, which application is hereby incorporated herein by reference in its entirety.

BACKGROUND

From DE 10 2004 047 048 A1 there is known a feeding device for supplying elongated material along a feeding device. The feeding device comprises a plurality of clamping devices with clamping jaws which can be adjusted between a clamping position for clamping the elongated material and a releasing position for releasing the elongated material. In the clamping position, the clamping device can be moved in the direction of feed.

From DE 32 08 158 A1 there is known a chain pulling and chain braking device by means of which tensions of metal strips shall be kept constant. The metal strip is clamped in between two opposed continuously running chain systems. The chain segments are provided with a coating which can be formed of elastic coatings with an additional profile.

DE 40 09 862 A1 proposes a device for pulling and braking metal strips. The device consists of two strip-like tensioning elements which are positioned opposite one another in a framework, which circulate continuously over a driving roll and a deflection roll and between which the metal strip is clamped in. The tensioning elements are provided in the form of infinite metal strips produced from a titanium aluminium alloy. In order to prevent relative movements between the metal strip and the continuously moving titanium strips, the titanium strips are provided with a friction lining. For the friction lining an elastomer is proposed. The driving rolls of the two tensioning elements are driven by driving assemblies.

From DE 299 09 850 U1 there is known a device for pulling and braking metal strips. The metal strip is clamped in and guided between two opposed roll blocks which are driven by chain gears. This system is said to achieve speeds of up to 1,500 m/min for example.

In prior art pulling or braking devices a constant process speed is an essential precondition to allow such devices to function. Only slight differences in speed between the tensile side and the pressure side of the strip material can be compensated for by elastic friction jaws or by sliding friction between the device and the metal strip.

DESCRIPTION

Disclosed herein is a device and a process for transporting elongated metal material, in particular strip material, wire material, pipe material and/or profiled material. The proposed transport device for elongated metal material, in the process direction of the elongated material, permits a high degree of variability in respect of movement kinematics. Further proposed is a suitable process which, in the case of inconsistencies during the working process of the elongated material, provides possibilities for compensation. Furthermore, a plant is proposed which compensates for different path lengths and speeds respectively.

A solution is proposed by a device for transporting elongated metal material, in particular strip material, wire material, pipe material or profiled material, comprising: a controllable first chain drive unit with an infinite first chain; a controllable second chain drive unit with an infinite second chain; wherein the first and the second chain drive units are arranged such that the elongated material is passed through between the first and the second chain under frictional contact, so that the elongated material—when the first and the second chain drive units are in operation—is moved in the direction of movement of the chain portions which are in contact with the elongated material; a controllable first pressure unit which is configured to apply a first pressure to the first chain towards the elongated material; a controllable second pressure unit which is configured to apply a second pressure force to the second chain towards the elongated material; at least one controllable adjusting unit which is mechanically connected to at least one of the first and the second chain drive units and is configured to move same during operation in the longitudinal direction of the elongated material.

An advantage of said device is that it is possible by the at least one adjusting unit to adjust different forces and/or tension levels on the two sides of the process, i.e., between the entry and the exit of the elongated material. In this context, the term entry shall indicate a region of the elongated material which, in the direction of feed, is located in front of, i.e., upstream the transport device. Accordingly, the exit is to be understood to be the region of the elongated material which in the feed direction is positioned behind, i.e., downstream of, the transport device. As an advantage, the at least one adjusting unit thus offers the possibility of compensating for differences in the path lengths and/or speeds between the entry and the exit of the elongated material. The expression "at least one adjusting unit" in connection with the present disclosure means in particular that one adjusting unit can be provided which acts on both chain drive units for moving same jointly, or that per chain drive unit an associated adjusting unit is provided. The at least one adjusting device can also be referred to as a setting device.

The at least one adjusting unit can move at least one chain assembly relative to a stationary component, thus influencing the feed of the elongated material. Accordingly, the movements transmitted by the chain drive units to the elongated material and the movements transmitted by the at least one adjusting unit to the elongated material are superimposed to form a resultant movement of the elongated material. As regards the transport movement of the elongated material it is proposed in particular that said movement takes place continuously, and with a variably controllable speed. The device can also be referred to as a pull and transport system allowing a speed and path adjustment for elongated products.

The expression "elongated metal material" in connection with the present disclosure is intended to mean a metal-based material which, in its main direction of extension (longitudinal direction), comprises an expansion which is substantially greater than in another direction of extension, for example at least ten times greater. In particular, the term "elongated material" is meant to include a strip material, wire material or profiled material made from a metal material. "Metal material" refers to all materials workable in the form of elongated material, for instance steel, high-grade steel, light metal such as aluminium, non-ferrous metal such as copper, brass or bronze as well as alloys having several metallic components. The use of elongated material in the form of plastics is generally also possible.

According to an example, the first and the second chain drive units are designed so as to be identical in respect of structure and operation mode. It is therefore understood that all details described in connection with the present disclosure in respect of one of the two chain drive units can also apply to the second chain drive unit unless otherwise stated. This, incidentally, also applies to the first and the second pressure unit and—if two separate adjusting units are provided—also for them, which can also be identical in respect of structure and mode of operation.

The chain drive units can each comprise a separate motor for driving the chain assembly. The chain assembly comprises a plurality of inter-connected chain members and is provided in the form of an infinite chain. Furthermore, the two chain drive units can each comprise a carrier, a driving roll and a deflection roll around which the chain is arranged so as to circulate. The driving roll and the deflection roll are rotatably supported on the first carrier at a distance from one another. The driving roll which is rotatably drivable by the motor engages the chain preferably in a form-locking way to transmit torque from the motor to the chain. The motor can be provided, for example, in the form of an electric or a hydraulic machine. For each chain drive unit there can be provided a separate motor which rotatingly drives the respective chain assembly. The motor for driving the first chain assembly and the motor for driving the second chain assembly can be synchronised with respect to controlling, so that the two chain units are moved at a same rotational speed.

According to an example, a chain assembly comprises a plurality of circumferentially distributed friction members. The friction members are designed such that they come into friction contact with the elongated material during the rotating movement of the chain assembly and thus move the elongated material clamped in between the two opposed chain assemblies in the direction of feed. One or several friction members can be arranged at a respective one of the chain members. In particular, it is proposed that the friction members each comprise a friction lining which is adapted to the material of the elongated material in such a way that a static friction is generated between the friction lining and the elongated material. The forces and the materials of the components taking part in the movement can be adjusted such that, substantially, only static friction is generated at the elongated material, so that the rate of wear is low and the surface of the elongated material is saved.

According to a possible more specific example, the friction lining can comprise metal components such as copper, brass, iron, grey iron—in each case either in the form of powder or fibres—mineral fibres and/or sulfides of iron, copper, antimony, zinc, molybdenum. It is understood that the use of other materials is also possible for the friction lining, for example plastics and/or rubber.

The chain assemblies of the two drive units are each force-loaded by an associated pressure unit towards the elongated material, so that friction forces are built up between the friction members and the elongated material. A pressure unit can comprise several roll members arranged in parallel next to each other which are rotatably supported on a carrier plate. The roll members are in contact with the side of the chain members, which side faces away from the elongated material, and load same towards the elongated material. It is proposed in particular that a first pressure unit and a second pressure unit are arranged opposite to each other, wherein the forces acting directly from the two pressure units upon the elongated material are directed towards each other. The pressure forces are generated by at least one actuating drive, for instance by a hydraulic machine. According to a first possibility, the at least one actuating drive is supported on a stationary component. Alternatively, the at least one actuating drive can be supported against the opposed pressure units, so that, when the actuating drive is actuated, these are directly loaded against each other.

The actuating drive can act on the carrier plate for loading same according to the requirements, to a greater or lesser extent, towards the elongated material. According to an example it can be proposed that the first pressure unit and the second pressure unit are fixed to a stationary component, for example a frame, in the feed direction of the elongated material. Accordingly, a movement of the pressure units would only be possible in the normal direction, i.e., towards the elongated material or away from same. The pressure force generated from the adjusting drive(s) can be individually set and variably controlled. In particular, the pressure force of one or both pressure units can be generated independently of the driving speed of the chain assemblies and of the position, respectively movement of the at least one adjusting unit.

According to an example, the at least one adjusting unit is supported against a stationary component. By actuating the adjusting unit, a force is applied in the main direction of extension of the elongated material to the chain drive unit connected to the adjusting unit. In this connection main direction of extension means either in or against the feed direction of the elongated material, i.e., in the longitudinal direction. The stationary component at which the adjusting unit is supported and fixed respectively, can be a stationary frame of the drive for example.

The adjusting unit can comprise a linear drive which can, in particular, be provided in the form of a hydraulic piston-cylinder unit. A hydraulic adjusting unit is advantageous in that it can be dynamically and quickly controlled. In a more specific example, a first portion of the linear drive can be connected to the stationary component and a second portion of the linear drive can be connected to the associated chain drive unit. The speed and/or position of the linear drive is variably adjustable. By actuating the adjusting unit, the associated chain drive unit can be moved relative to the stationary component, i.e. in or against the feed direction of the elongated material. If the control unit is controlled such that the drive unit is moved in the direction of feed, a higher tensile force is generated at the input end than at the output end. Conversely, i.e., if the drive unit is moved against the direction of feed by the adjusting unit, the tensile force at the input end is lower than at the output end. The two drive units can be longitudinally displaceably guided in the stationary component in the main direction of extension of the elongated material by suitable guides.

According to an example, a control unit is provided for controlling the feed speed and/or the tractive force of the elongated material. One and only one control unit can be provided, which controls the two adjusting units, the two drive units and the at least one pressure unit and, for this purpose, is controllingly connected to said units. In particular, it is proposed that each individual control parameter can be individually set by the control unit. Furthermore, the individual control parameters can be continuously set between a maximum value and a minimum value.

To achieve a uniform introduction of force and thus a uniform movement of the elongated material it is advantageous if the two chain drive units are driven synchronously, i.e., that the same forces and speeds are applied to the upper side of the elongated material and to the underside of the elongated material. The same can apply to the control of the two pressure units and/or the control of the two adjusting units if two adjusting units are used.

According to a more specific example, at least some of the assemblies or components of the first and/or of the second drive unit can be produced from lightweight construction material, in particular from light metal or fibre-reinforced plastics. The use of a lightweight construction material is advantageous as regards uncoupling the adjusting kinematics and/or the actuation forces of the three units. By producing individual assemblies or components in a lightweight construction method, the amount of energy required for operating the plant is small.

Further disclosed is a plant for processing elongated metal material, the plant having at least one tool for continuously working the elongated metal material in a direction of feed of the elongated material and a device for transporting the elongated material, which device comprises at least one of the above-mentioned embodiments.

Said plant has the same advantages mentioned in connection with the device and to which reference is hereby made. The device provides for compensating for differences in speed and for path length between different plant components, for instance between a plant component arranged in front of or behind the device. By using said device it is possible to carry out two successive working processes of the elongated material which require different speeds of feed.

According to a first possibility, the transporting device can be arranged in the feed direction of the elongated material behind (i.e., downstream of) the tool, so that the device applies a tractive force to the elongated material, by which the elongated material is pulled through the tool. According to a second possibility, the device can also be arranged in front (i.e. upstream) of the tool with respect to the feed direction of the elongated material, so that, with reference to the tool, the device applies a pressure force to the elongated material, by which force the elongated material is pushed through the tool. As explained above, the device can also be arranged between two tools which can also be referred to as plant components.

In principle, the tool can be any tool used for processing elongated material, for example a rolling tool, a cutting took, a coating tool, a profiling (shaping) tool and/or an embossing tool. The tool is particularly suitable for being used in connection with a rolling tool where the thickness of the strip material is reduced, which leads to different speeds between the entry and exit of the rolling tool. A special type of rolling is the flexible rolling wherein the strip material receives a variable sheet thickness over the length. With a variable entry speed, this involves an almost constant speed of the flexibly rolled strip material at the exit side of the rolling tool. Thus, the device is particularly suitable in a plant for flexible rolling, wherein the device can be arranged upstream and/or downstream the flexible rolling tool. In this connection, an almost constant speed at the exit side shall include changes of speed of up to 5%.

Further disclosed is a process for transporting elongated metal material, more particularly strip material, wire material, pipe material or profiled material, by a device with two chain drives between which the elongated material is guided through under friction contact, two pressure units for pressure-loading chain portions against the elongated material, and at least one adjusting unit for displacing the chain drive units in the longitudinal direction of the elongated material, the process comprising the following steps: driving the two chain drive units, wherein friction members of the two chain drive units enter into friction contact with the elongated material, so that the elongated material is clamped in between opposed friction members and is moved jointly therewith; determining at least one physical process value of the elongated material which influences the transport of the elongated material in front of and/or behind the device; calculating a physical target value of the elongated material which influences the transport of the elongated material, taking into account the physical process value as determined; and controlling the at least one adjusting unit on the basis of the calculated physical target value such that the two chain drive units are variably adjusted in the longitudinal direction of the elongated material relative to a stationary component, wherein a first movement transmitted by the chain drive units to the elongated material and a second movement transmitted by the at least one adjusting unit to the two chain drive units are superimposed on one another and cause a resulting movement of the elongated material.

Said process provides the above-mentioned advantages of compensating differences between speed and path length between plant components for working elongated products.

According to a more specific embodiment, a first physical process value can be determined in front of the device, for instance the entry speed and/or the entry force of the elongated material, and a second physical process value can be determined behind the device, for instance the exit speed and/or the exit force of the elongated material.

A further process step can be provided in that for controlling the pressure indirectly applied by the two pressure units to the elongated material, the first and the second physical process values are taken into account.

In an example, the two chain drive units, the two pressure units and the at least one adjusting unit are controlled independently of one another.

Overall, the device can be controlled by the process in such a way that the speed and/or the force of the elongated material can be adapted to the requirements of the upstream and/or downstream processes in a suitable way. For example, the at least one adjusting unit can be controlled such that at one side, i.e., the entry side or the exit side, the longitudinal force acting on the elongated material amounts to zero and that at the other side the nominal tractive force required for the respective process is applied. Setting the tractive force to zero is advantageous in that there is no need for a further device for applying a basic tension. It is to be understood that other tractive forces ranging between zero and the nominal force can also be set.

A preferred embodiment will be explained below with reference to the drawings wherein FIG. 1 shows an inventive device for transporting elongated material in a first working position.

Figure 2:
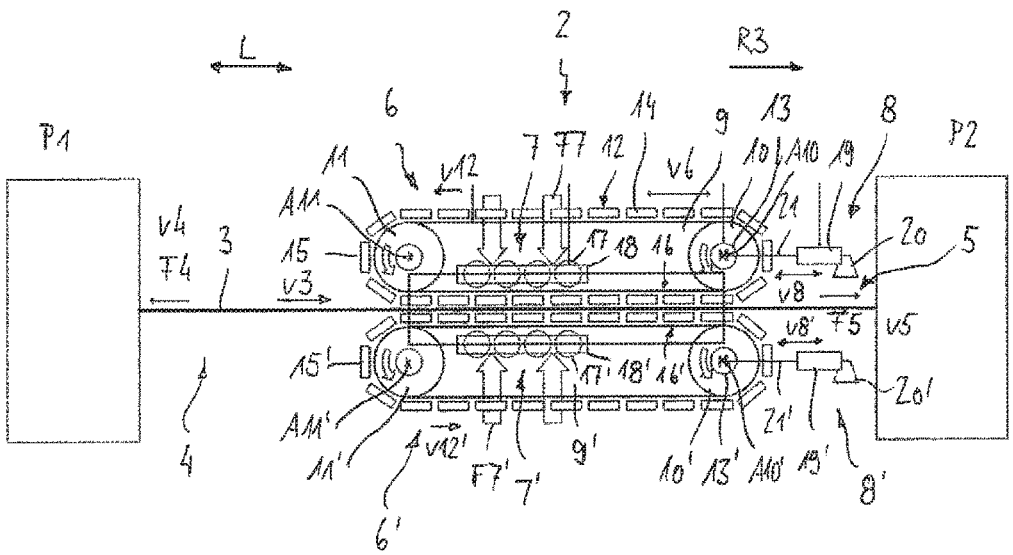

FIG. 2 shows the device according to FIG. 1 in a second working position.

FIGS. 1 and 2, which will be described jointly below, show a device 2 for transporting elongated material 3, which device can also be referred to as a transport device. In the present example, the device 2 is arranged between two working processes P1, P2. In a first working process P1 which, in feed direction of the elongated material 3, is arranged in front of the transport device, the elongated material 3 is worked in a first way, and in a second working process P2 which is arranged behind the transport device 2, the elongated material is worked in a second way.

Elongated material is understood to be a material which, in a main direction of extension (longitudinal direction L), comprises an expansion which is at least ten times greater than in a second direction of extension (direction of width and/or thickness). In particular, the elongated material can be a strip, wire, pipe or profiled material made of a metal material. For example, a metal material can be steel, high-grade steel, light metal such as aluminium, non-ferrous material such as copper, brass and bronze as well as alloys having several metal components.

The working processes P1, P2 and the design of the tools used for these depend on the type of the elongated material 3. A working process may also be referred to as machining process. If a metal-based strip material is used as elongated material, at least one of the two working processes P1, P2, or both, can be, for example, a rolling, cutting, coating, profiling and/or embossing process. In this case, the two working processes P1, P2 can temporarily comprise different processing speeds for working the elongated material. For example, a rolling process can temporarily be carried out quicker or slower than a subsequent cutting process.

The device 2 arranged between the two working processes P1, P2 allows a variable adjustment of the forces F4, F5, which act on the elongated material 3 at the entry 4 and exit 5 of the transport device, which adjustment is adapted to the respective working process P1, P2.

In the present example, the transport device 2 is shown to be arranged between two working processes P1, P2. It is to be understood however, that the device 2 can also be used in an arrangement having only one working process and only one plant component. For example, the device 2 can be arranged in front of or behind one single working tool for working the elongated material 3. Because of its properties to apply a tensile force to the elongated material, the device 2 can serve as a substitute for an otherwise necessary coiler.

Below, the design and the mode of operation of the device 2 as such is explained in greater detail. The device 2 comprises a plurality of functional units which work together in pairs, i.e., a first and a second chain drive unit 6, 6', a first and a second pressure unit 7, 7' and a first and a second adjusting unit 8, 8'. Also provided is a control unit (not shown) for controlling transport parameters affecting the transport, in particular the speed of feed v3 and/or the tractive force F4, F5 of the elongated material 3.

The two chain drive units 6, 6' each comprise a carrier 9, 9', a driving roll 10, 10', a deflection roll 11, 11', a continuous chain 12, 12' and a motor 13, 13'. The driving roll 10, 10' and the deflection roll 11, 11' are arranged at a distance from one another at the carrier 9, 9' so as to rotate around respective rotational axes A10, A11. The driving roll 10, 10' can be rotatingly driven by the associated motor 13, 13' and transmits the torque introduced by the motor to the respective chain 12, 12'. For this purpose, the driving roll 10, 10' can be provided with suitable form-engaging means which form-lockingly engage corresponding form-engaging means of the chain 12, 12'. The motor can be an electric motor or a hydraulic motor, for example. To achieve uniform driving conditions and a uniform introduction of force at the upper and lower end of the elongated material 3, it is provided that the first motor—for driving the first chain unit 6—and the second motor 13'—for driving the second chain unit 6'—are driven synchronously, so that the two chain units 6, 6' are moved at identical revolution speeds v12, v12'.

The chains 12, 12' each comprise a plurality of interconnected chain members 14, 14'. Each chain member 14, 14' can comprise one or a plurality of friction members 15, 15' which are designed such that they come into friction contact with the elongated material 3 during the circulating movement of the chain assembly 12, 12' and thus move the elongated material 3 clamped in between the two opposed chain assemblies 12, 12' in the direction of feed R3. The friction members 15, 15' can each comprise a friction lining whose friction material is adopted to the material of the elongated material such that static friction is generated between the friction lining and the elongated material. For transporting a piece of elongated material consisting of steel, the friction lining can comprise in particular metal components such as copper, iron, grey iron, in each case in the form of powder or fibres, and/or mineral fibres and/or sulfides of steel, copper, antimony, zinc, molybdenum which can be embedded in a carrier material.

The chain portions 16, 16' which are in friction contact with the elongated material 3 are loaded by an associated pressure unit 7, 7' with a pressure force F7, F7' in direction towards the elongated material 3, i.e. in the normal direction of the elongated material. It can be seen that the two pressure units 7, 7' are arranged in such a way that the pressure forces F7, F7' are directed towards each other. The strength of the pressure force can be variably adjusted, so that the friction forces between the friction members 15, 15' and the elongated material 3 can also be varied, which friction forces depend on the normal force.

The pressure units 7, 7' each comprise several roll members 17, 17' which are rotatably supported on a carrier plate 18, 18'. The roll members 17, 17' act on a side of the chain members 14, 14', which side faces away from the elongated material 3 and load said chain members towards the elongated material 3. The pressure forces F7, F7' are generated by at least one actuating drive (not shown), for example by a hydraulic machine. The actuating drive which may also be referred to as power drive or setting drive, in turn, is controllingly connected to the electronic control unit, by means of which the transport process is controlled. In particular, it is proposed that the magnitude of the pressure forces F7, F7' can be variably controlled/adjusted by the control unit between a maximum value and a minimum value, depending on requirements. In an example, the actuating drive of the first pressure unit 7 and the actuating drive of the second pressure unit 7' are operated synchronously, so that the forces F7, F7' which act on the elongated material from opposed sides are equal. The two pressure units 7, 7' can be fixed to a stationary component, for instance a frame, so as to be fixed in the feed direction R3 of the elongated material. According to an alternative example, the pressure units 7, 7' can be loaded against each other directly by means of one or several power drives which are each supported on both pressure units.

For generating a compensating effect between the entry side 4 and the exit side 5 of the transport device, an adjusting device 8, 8' is provided per chain drive unit 6, 6' by which adjusting device the associated chain drive unit can be moved in the longitudinal direction L of the elongated material. According to an alternative embodiment, it is also possible to provide only one single adjusting unit which drivingly acts on both chain drive units.

The adjusting units 8, 8' are each provided in the form of a hydraulic piston-cylinder unit and it is understood that other linear drives such as a spindle drive can also be used. The adjusting units 8, 8' have an adjustable, i.e., changeable length, wherein a first portion 19, 19' is connected to and/or supported against a stationary component 20, 20' and wherein a second portion 21, 21' is connected to the associated chain drive unit 6, 6' so as to transmit force to same. The speed and/or position of the adjusting units 8, 8' can be set variably by the control unit.

The adjusting units 8, 8' are designed for moving the respectively associated chain drive unit 6, 6' relative to the stationary component 20, 20', i.e. in or against the feed direction R3 of the elongated material 3. By actuating an adjusting unit 8, 8', an actuating force F8, F8' is applied to the respective chain drive 6, 6' which affects the tensile force of the elongated material at the entry 4 and, respectively, at the exit 5. Furthermore, the chain drive 6, 6', in its entirety, is moved relative to the stationary component 20, 20' with a setting speed v6, v6' which corresponds to the linear setting speed v8, v8' of the adjusting unit 8, 8'. When the adjusting unit 8, 8' is actuated, a first movement, respectively speed v12, v12', transmitted by the chain drive units 6, 6' to the elongated material 3 and a second movement, respectively speed 8, v8', transmitted by the two adjusting units 8, 8' to the chain drive units 6, 6' are superimposed to each other so that a resultant movement and, respectively, speed v3 of the elongated material 3 is obtained.

According to a possible control method, it can be provided that at least one substantially constant basic speed v12, v12' of the elongated material 3 is set by the chain drive units 6, 6', and that a dynamic adjustment of the speed for controlling the process is effected by the adjusting units 8, 8'. For this purpose, hydraulic adjusting units are particularly suitable because they can be quickly dynamically controlled. As input parameters for controlling the transport process, for example, the speed v4 and/or the traction force F4 at the entry side and/or the speed v5 and/or the traction force F5 at the exit side 5 can be used. On this basis a nominal value (target value) for the traction force acting from the chain drive units 6, 6' upon the elongated material 3 can be determined according to which value the motors 13, 13' of the chain drive units, the drives of the pressure units 7, 7' and the adjusting units 8, 8' are controlled accordingly.

If an adjusting unit 8, 8' is controlled such that the chain drive unit 6, 6' is moved in the feed direction R3, i.e., moved from the position shown in FIG. 1 into the position shown in FIG. 2, the tensile force F4 generated at the entry side 4 of the elongated material 3 is higher than at the exit side 5. Conversely, i.e., if the chain drive unit 6, 6' is moved by the adjusting unit 8, 8' against the feed direction R3, i.e., from the position shown in FIG. 2 into the position shown in FIG. 1, the tensile force F4 at the entry side 4 is lower than at the exit side 5. The two chain drive units 6, 6' can be guided in the stationary component 20, 20' so as to be longitudinally displaceable in the longitudinal direction of the elongated material 3 by means of suitable guides (not shown).

The transport device 2 and, respectively, the process which can be carried out with same are suitable for variably adjusting and controlling different forces and/or tensile levels on the two process sides 4, 5. In this way it is possible to compensate the path lengths and/or speeds between the entry 4 and the exit 5.

The invention claimed is:

1. A device for transporting elongated metal material, comprising:
    a controllable first chain drive unit including a continuous first chain;
    a controllable second chain drive unit including a continuous second chain;
    wherein the first and the second chain drive unit are arranged such that the elongated material is passed between the first and the second chain with frictional contact so that, by operating the first and the second chain drive units, the elongated material is moved in a direction of movement of chain portions contacting the elongated material;
    a controllable first pressure unit configured to apply a first pressure force to the first chain towards the elongated material;
    a controllable second pressure unit configured to apply a second pressure force to the second chain towards the elongated material; and
    at least one controllable adjusting unit mechanically connected to at least one of the first and second chain drive units and configured to move the at least one of the drive units in a longitudinal direction of the elongated material during operation;
    wherein the first chain drive unit, the first pressure unit and the at least one adjusting unit can be controlled independently from one another, so that the speed of feed of the elongated material is adjustable independently of the pressure force of the first pressure unit.

2. The device of claim 1,
    wherein the first chain drive unit is movable relative to the first pressure unit in the longitudinal direction of the elongated material,
    wherein the first pressure unit is held so as to be fixed to a stationary component in the longitudinal direction of the elongated material.

3. The device of claim 1,
    wherein the at least one adjusting unit is supported against a stationary component and comprises a linear drive, in particular a hydraulic piston cylinder unit,
    wherein a first portion of the linear drive is connected to the stationary component and a second portion is connected to the chain drive unit, so that a change in length of the linear drive effects a movement of the chain drive unit relative to the stationary component.

4. The device of claim 1,
    wherein a control unit is provided for controlling at least one physical process value influencing transport of the elongated material,
    wherein the control unit is controllingly connected to the first and to the second chain drive unit, to the first and to the second pressure unit and to the at least one adjusting unit.

5. The device of claim 1, wherein at least two of the first chain drive unit and the second chain drive unit, the first pressure unit and the second pressure unit, and the at least one adjusting unit are actuatable synchronously.

6. The device of claim 1, wherein the first chain drive unit comprises a plurality of circumferentially distributed friction members which are configured to be brought into friction contact with the elongated material for transport purposes.

7. The device of claim 6, wherein the friction members each comprise a friction lining which is adapted to the elongated material such that static friction is ensured under all operational conditions.

8. The device of claim 1, wherein at least some components of the first chain drive unit are produced from lightweight material.

9. The device of claim 1, wherein a tool is provided for continuously working the elongated metal material in a feed direction of the elongated material.

10. The device of claim 9, wherein the device is arranged behind the tool with respect to the feed direction, so that the device applies a tensile force to the elongated material by which the elongated material is pulled through the tool.

11. The device of claim 9, wherein the tool is one of a rolling tool, a cutting tool, a coating tool, a profiling tool, and an embossing tool.

12. A process of transporting elongated metal material by a device with two chain drive units between which the elongated material is passed under frictional contact, two pressure units for pressing chain portions against the elongated material, and at least one adjusting unit for displacing at least one of the two chain drive units in the longitudinal direction of the elongated material, the process comprising:
- driving the two chain drive units, wherein friction members of the two chain drive units come into frictional contact with the elongated material, so that the elongated material is clamped in between opposed friction members and are moved jointly therewith;
- determining a physical process value of the elongated material influencing the transport of the elongated material at least in one of in front of and behind the device;
- calculating a physical target value of the elongated material which influences the transport of the elongated material, thereby taking into account the physical process value as determined; and
- controlling the at least one adjusting unit on the basis of the calculated physical target value such that the two chain drive units are variably adjusted in the longitudinal direction of the elongated material relative to a stationary component,
- wherein a first movement transmitted by the two chain drive units to the elongated material and a second movement transmitted by the at least one adjusting unit to the two chain drive units superimpose one another and cause a resulting movement of the elongated material.

13. A process according to claim 12, wherein a first physical process value determined in front of the device is the entry speed or the entry force of the elongated material; and
- wherein a second physical process value determined behind the device is the exit speed or the exit force of the elongated material.

14. A process according to claim 12, further comprising controlling a pressure indirectly applied by the two pressure units to the elongated material, thereby taking into account at least one of the physical process values already determined.

15. A process according to claim 12, wherein the two chain drive units, the two pressure units, and the at least one adjusting unit are controlled independently of one another.

16. A device for transporting elongated metal material, comprising:
- a controllable first chain drive unit including a continuous first chain;
- a controllable second chain drive unit including a continuous second chain;
- wherein the first and the second chain drive unit are arranged such that the elongated material is passed between the first and the second chain with frictional contact so that, by operating the first and the second chain drive units, the elongated material is moved in a direction of movement of chain portions contacting the elongated material;
- a controllable first pressure unit configured to apply a first pressure force to the first chain towards the elongated material;
- a controllable second pressure unit configured to apply a second pressure force to the second chain towards the elongated material; and
- at least one controllable adjusting unit mechanically connected to at least one of the first and second chain drive units and configured to move the at least one of the drive units in a longitudinal direction of the elongated material during operation;
- wherein a control unit is provided for controlling at least one physical process value influencing transport of the elongated material;
- wherein the control unit is controllingly connected to the first and to the second chain drive unit, to the first and to the second pressure unit and to the at least one adjusting unit.

17. A device for transporting elongated metal material, comprising:
- a controllable first chain drive unit including a continuous first chain;
- a controllable second chain drive unit including a continuous second chain;
- wherein the first and the second chain drive unit are arranged such that the elongated material is passed between the first and the second chain with frictional contact so that, by operating the first and the second chain drive units, the elongated material is moved in a direction of movement of chain portions contacting the elongated material;
- a controllable first pressure unit configured to apply a first pressure force to the first chain towards the elongated material;
- a controllable second pressure unit configured to apply a second pressure force to the second chain towards the elongated material; and
- at least one controllable adjusting unit mechanically connected to at least one of the first and second chain drive units and configured to move the at least one of the drive units in a longitudinal direction of the elongated material during operation;
- wherein the at least one adjusting unit is supported against a stationary component and comprises a linear drive, in particular a hydraulic piston cylinder unit;
- wherein a first portion of the linear drive is connected to the stationary component and a second portion is connected to the chain drive unit, so that a change in length of the linear drive effects a movement of the chain drive unit relative to the stationary component.

* * * * *